United States Patent Office 3,317,770
Patented May 2, 1967

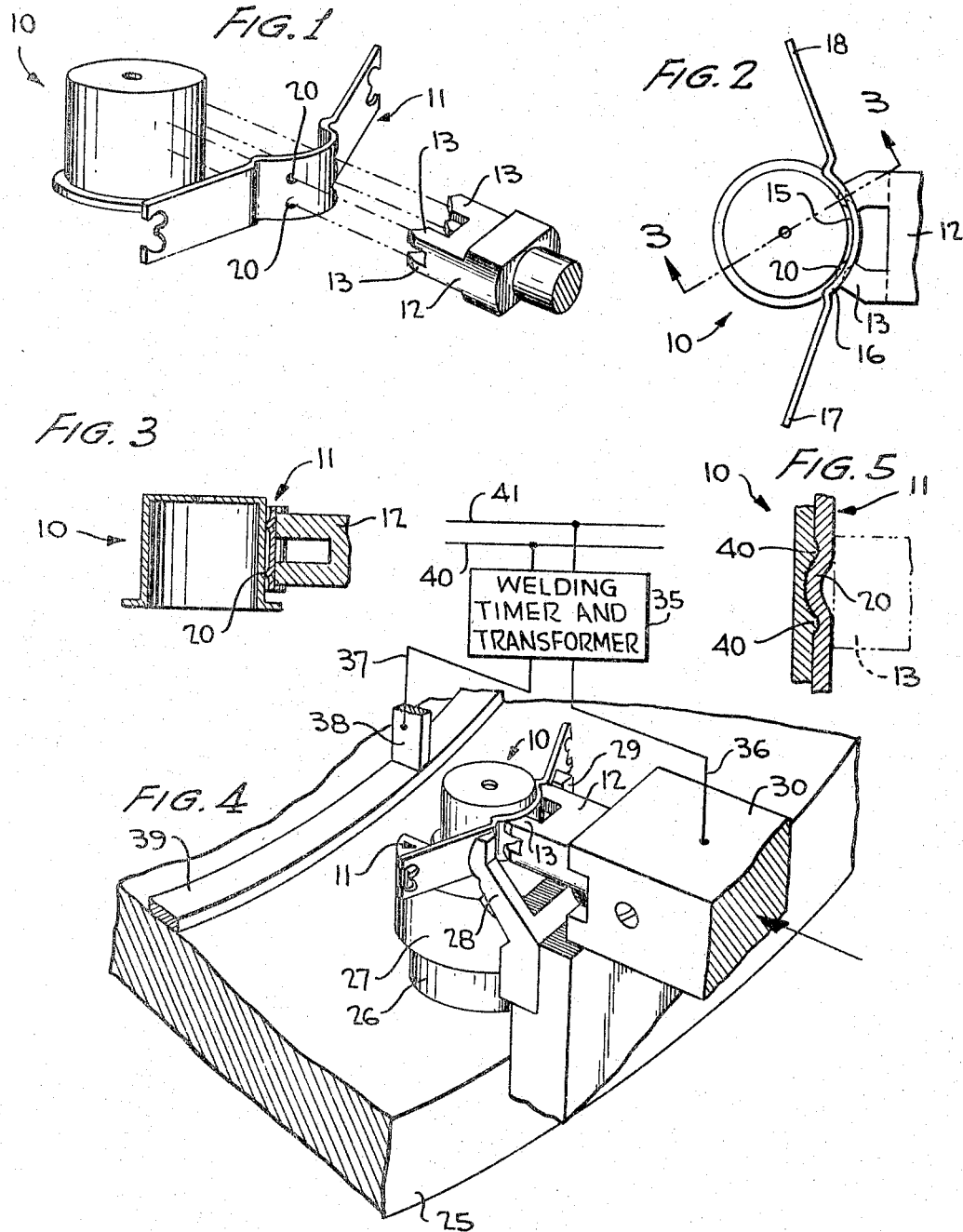

3,317,770
CATHODE RAY TUBE ELECTRON GUN AND
SUPPORT THEREFOR
Chester O. Merchant, Owensboro, Ky., assignor to Kentucky Electronics Inc., Owensboro, Ky., a corporation of Kentucky
Filed Jan. 28, 1966, Ser. No. 523,715
2 Claims. (Cl. 313—82)

The present invention relates to electrode components for use in electron tubes and, more particularly, to an improved electrode component and a method of making the same, said electrode component including an electrode body and a mounting member welded to said body, to form the cylindrically shaped electrode with mounting stud used to process the beam in a cathode ray picture tube.

In the manufacture of metal components for electron tubes, it is sometimes necessary to fabricate an electrode component, for example, electron gun components for cathode ray tubes by welding a member to the electrode body without materially affecting the structure of the body. A problem widely encountered in this field results from excessively heating a localized portion of the electrode body during the welding operation. This excessive heating causes deterioration of the metal or what is commonly known as weld-splashing, which can be identified by discoloration and the formation of minute pits and projections on the critical surfaces of the electrode component. This deterioration of the metal has been found to be the cause of certain irregularities in the performance of an electron gun. For example, the formation of regions that encourage the escape of electrons from the electrode components and thus cause corona discharge between electrodes operated at different potentials can result from this pitting or splashing of the metal along the outside surface of the electrode component. Also, a change in the electrical properties of the critical inside surface of the electrode body which is to be maintained at a critical potential for forming the electron beam is thought to result from such weld splashing or whiskering of the metal in the regions of excessive heating in the vicinity of the weld.

The problem of obtaining a good rigid weld without excessive localized heating of the metal is compounded when the area of mutual contact between the electrode body and the mounting member is relatively large as is the case in the recently developed electrode components for color television guns wherein a relatively thin-walled electrode body is welded to a relatively thin mounting strap along a contoured face. One prior art method of performing the welding operation is obtained by the use of a pointed welding electrode that engages one or a plurality of spot welding zones on the component. One difficulty that arises from this type of arrangement is that the sharp electrode is usually found to be generally ineffective to cause sufficient penetration of the surface of the electrode body by the metal of the mounting member which results in inexact and weak welds being formed between said mountnig member and said body. Further, when the electrical current is introduced across the mounting member from a pointed electrode, the density of the electrical current flowing from the member to the body tends to be rather high so that the undesired deterioration of the metal is likely to occur due to excessive localized heating. Because of this difficulty, the current flow must be kept at a minimum which makes it very hard for the operator to control the weld and further makes it necessary for the welding current to be applied for a longer period of time than would otherwise be required. Also, because it has been found to be difficult to control the current flow in these situations, welds of this type usually have been carried out individually by single welding electrodes, which make it a time-consuming and costly operation where multiple welds are required.

Another prior art welding technique that has been applied to metal electron gun parts involves engaging the back of the mounting member with a blunt electrode across the full width of the predetermined weld area and then applying welding current across this entire area of engagement to create the welded joint. This procedure has been proposed where the mounting member has projections on the face that engages the electrode body to localize and concentrate the welding current, as described in the U.S. Patent to Erskine No. 2,897,391, issued July 28, 1959. Also, this technique has been proposed where there are no projections but merely a flat face for engaging the outside surface of the electrode body. In either of these cases the current flow and the heating of the parts that is required has been found to be excessive due to the unnecessary heating of portions of the electrode component and the welds have also been found to be generally inferior due to lack of sufficient penetration of the welded parts.

It has been proposed in one case of which I am aware to prevent undesirable welding between the projections by forming the intermediate portion of the mounting strap so as to be spaced a distance from the body of the electrode in the welded position. This space, while effectively preventing contact and undesirable heating and welding of the mounting member except in the desired areas, tends to make the welded joint less rigid and more susceptible to failure. Also, the uneven thickness and odd shapes created by forming the mounting member in this manner not only makes the member more expensive to fabricate but tends to create hot spots in the body of the member thereby causing unpredictable localized heating and thus, harmful splashing.

Accordingly, it is one object of the present invention to provide a welded electrode component and a method of making the same that overcomes the above mentioned difficulties and provides a welded component that is substantially free of weld splash.

It is another object of the present invention to provide an electrode component and method that requires a minimum amount of electrical current and time for welding the electrode body and the mounting member together.

It is a further object of the present invention to provide an electrode component and method of making same wherein there is little or no formation of sharp projections or whiskers due to deterioration of the metal in the finished component by excessive localized heating.

It is further another object of the present invention to provide an electrode component and method of making the same wherein a predictable and high quality weld is obtained between the electrode body and the mounting member so that the electrode component has a long service life.

According to the present invention the electrode component or unit is embodied by an electrode body and a mounting member having a contoured face to fit the configuration of said body which, of course, can be flat or curved in the required manner. Formed either in the electrode body or the mounting member but preferably formed in the latter as illustrated in the accompanying drawing, is a plurality of embossed zones that include raised surface portions of substantially equal height that contact said body and corresponding recessed surface portions on the opposite face with the welds being formed only at said embossed zones between said raised surface portions and said body. According to the invention, the mounting member can be advantageously positioned in substantially face-to-face contact with said body so as to provide additional rigidity. The use of embossed zones having recesses that correspond to the projections on the contoured face of the mounting member insures that the portion of the mounting member between the welds is substantially the same thickness so that there is no unnecessary heating of the metal and no hot spots created that might adversely affect the performance of the electrode component by the formation of weld splash or that might decrease the quality and strength of the welds. Also, since the welds are formed only at the embossed zones in predetermined areas, the welding current applied is used to maximum advantage.

According to the process of the present invention, the electrode component is made by first embossing the separate mounting member in a plurality of zones to form embossed projections including raised surface portions on one side and opposed recessed surface portions on the opposite side. Then the pre-formed mounting member is held against the electrode body so that the raised surface portions contact said body to form an electrical conducting path. Next, the opposite side of the mounting member is contacted with a welding head under pressure only in the region of the recessed surface portions and welding energy is applied to said regions to form a main weld between the raised surface portions of said mounting member and said body and then to form a peripheral reversely directed projection weld around each of said main welds.

Thus, it is a further object of the present invention to provide an electrode component of the character described wherein the parts are particularly adapted for welding in discrete areas without the application of excessive heating.

Still another object of the present invention is to provide an electrode component of the type described wherein the mounting member is pre-formed with embossed projections or zones, which projections are welded to the electrode body by penetration into said body and by reversely directed projection welds around each embossed projection without damage by weld splash, heat shrinkage and the like to the critical surfaces of the electrode.

It is still another object of the present invention to provide an electrode component of the type described wherein face-to-face contact between the mounting member and the electrode body is gained without causing undesirable welding between the predetermined embossed zones.

Another object of the present invention is to provide an electrode component of the character described and a method wherein the welding current is applied around the periphery of a recessed surface portion in the mounting member to prevent excessive heating of said member that might cause splashing and deterioration of the metal.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

Referring now to the drawings:

FIGURE 1 is a schematic showing of the manner in which the parts of an electrode component are aligned for the welding operation;

FIG. 2 is a top view of the electrode component prior to welding;

FIG. 3 is a cross-sectional view taken along line 3—3 of FIG. 2;

FIG. 4 is a showing of the application of the parts during the welding operation; and FIG. 5 is an enlarged cross-sectional view showing the parts in the region of the embossed zone after being welded in accordance with the teachings of this invention.

Specifically referring now to FIG. 1 of the drawings, there is shown an electrode body 10 that is to be welded to a mounting member or strap 11 through the application of welding energy by a suitable welding electrode 12. This welding energy is to be applied through the mounting strap 11 to the body 10 along a plurality of paths indicated by the dotted lines in this figure from a corresponding plurality of individual electrode portions 13 on said welding electrode 12. Thus, as will be apparent to those skilled in this art, the welding operation is or may be performed by electrical resistance welding; it being understood that the welding operation per se may be performed by applying other suitable welding energy that can generate the requisite heating of the parts, such as the recently developed ultrasonic welding techniques. However, for ease of description of the invention, in this application there is shown only the apparatus for performing electrical resistance welding, which will be discussed later.

As best seen in FIG. 2, in the preferred embodiment illustrated, the mounting strap 11 is pre-formed so as to have a contoured face 15 that substantially conforms to the curvature of the outside surface of the electrode body 10. The contoured face 15 defines an intermediate portion 16 that separates the substantially tangentially extending legs 17, 18 of the mounting member 11, which legs 17, 18 are adapted to be imbedded in thermoplastic material to position the electrode body 10 with respect to other similar bodies (not shown to form a color television electron gun assembly, as is well known in the art.

The electrode body 10 is relatively thin-walled within a range of about 0.005 to 0.010 inch and fabricated from a suitable non-magnetic material such as No. 305 Stainless steel having 12% nickel and 18% chrome. In the preferred embodiment illustrated, the mounting member 11 is also relatively thin usually within a range of about 0.015 to 0.025 inch thick and formed of a similar or identical metal. The electrode body 11 in the present case may be cup-shaped, as shown, or any other shape that is adapted for the particular function that is to be performed in the electron tube in which it is ultimately mounted for use.

As can be seen from collectively viewing FIGS. 1–3, the intermediate portion 16 of the mounting strap 11 has in accordance with the preferred form of the invention a plurality of embossed projections, each represented by the reference numeral 20. In the case where the projections are to be formed in the electrode body 10 (not shown), such as may be desired in the type of electrode which is used to mount the cathode of the electrode gun for example, wherein the contour of the cylindrical wall is not as critical as in the beam shaping electrodes, then the mounting strap 11 of course would not require the projections 20. In either case, the weld formed and the process used in accordance with the invention would be identical so that, for ease of description of the invention, it will be understood that only the preferred example wherein the projections 20 are formed on the mounting strap 11 will be discussed hereinafter.

The embossed zones 20 have been pre-formed by cold working so that the raised surface portion is substantially convex in shape and the corresponding recessed portion on the opposite face is substantially concave in shape. This formation of the embossed projections 20 to present a convex surface portion allows penetration of the thin-walled electrode body 10 without being carried through or damaging the critical inside surface of the electrode body which thus remains free of distortion so as to be capable of properly shaping the electron beam passing through said body.

The embossed projections 20 should be within the range of 0.002 to 0.006 inch in height for the particular electron gun component illustrated. This height is chosen, of course, to give the necessary penetration of the body 10 for a strong weld while not being of such height as to deform the inside surface of said body 10, as mentioned above.

For the purposes of illustrating a suitable arrangement for expediting the application of the electrical welding current to the electrode body 10 and the mounting member 11, there is illustrated in FIG. 4 a turntable 25 having a mandrel 26 mounted thereon for supporting the body 10 at the upper end thereof. Surrounding the mandrel 26, where is provided an insulator collar 27 that supports the mounting member 11 along its edge in juxtaposition to the electorde body 10 and in position to be engaged along the legs 17, 18 by a pair of upstanding fingers 28, 29 which serve to securely clamp the mounting member 11 to the electrode body 10 prior to the welding operation. The welding electrode 12 is carried by a suitable welding head 30 for movement in a horizontal plane transverse to the axis of the supporting mandrel 26 so that the welding electrode 12 can be brought into engagement with the back of the mounting member 11 whereupon energy can be passed through mounting member 11 and the electrode body 10 to create the desired welds at the embossed projections 20.

For the purpose of supplying a suitable source of welding energy for the welding operation, there is provided a conventional welding timer and transformer 35 which has a first lead 36 connected to the movable welding head 30 and a second lead 37 connected through a brush 38 to a circular track 39 mounted on the turntable 25. Thus, it can be seen that the electrical energy from input lines 40, 41 can be introduced through the electrode body 10 and the mounting member 11 after the welding electrode 12 has been brought into pressure engagement with the back of the mounting member 11 as indicated by the arrow in this figure, since there is a complete electrical circuit provided in the manner indicated.

Referring now to FIG. 5, there is illustrated a cross-section taken through one of the projection welds that is obtained with the use of the teachings of the present invention. It can be appreciated that the embossed projection 20 has penetrated the adjacent surface of the electrode body 10 sufficiently to form a strong bond between said electrode body 10 and said mounting member 11. The welding projection 20 is effective to penetrate the body 10 and form a strong weld without the application of large amounts of heat energy and pressure, which thereby minimizes the possibility of undesirable weld splash and makes the welding operation easier and more economical to perform.

This desirable result and advantage is gained by forming the welds only in the region of the embossed zones or projections 20 by the use of the accurately formed electrode portions 13 which engage the back of the mounting member 11 in the vicinity of these discrete or selected zones. As shown in FIGS. 2 and 5, the terminal ends of the electrode portions 13 are shaped so as to conform to the contour of the member 11 in said regions of the embossed zones 20. Further, the welding electrode portions 13 are adapted to span the recessed surface portion of said embossed zones 20 so as to engage the member 11 only around the outer peripheral area of the recessed surface portion of said zones 20, as shown in FIGS. 2 and 3. With this arrangement of contacting the member 11 over an area that is sufficiently larger than said embossed projection 20, a full charge of electrical current may be given to each embossed zone 20 along a hollow substantially cone-shaped path that terminates at the apex of said raised surface portion of said embossed projection 20. Thus since the welding current is not concentrated along the axis of the projection 20 but rather spread out over a larger area, the welding operation can be carried out without fear of causing detrimental weld splash, shrinkage, etc., due to excessively high heat density in a localized area. At the same time because the area of contact between the welding electrode 12 and the member 11 is limited to the regions of said zones or projections 20, the total amount of heat energy required is only slightly more than that required by the prior art methods of forming the spots individually by sharp pointed electrodes.

As the embossed zone 20 penetrates into the thin-walled electrode body 10 there is advantageously gained a substantially face-to-face contact between said electrode body 10 and the mounting member 11 for added strength and rigidity. By properly setting the welding timer 35 to regulate the amount of current flow and to terminate the flow of current upon reaching the face-to-face contact of FIG. 5, any unnecessary welding outside the selected embossed zones 20 is prevented since only the regions around the embossed zone 20 have been previously heated.

It has been found that the best penetration of the electrode body 10 by the embossed projections 20 for the strongest weld is gained when the diameter of said projection is relatively small. For example, in the preferred embodiment illustrated, the best welding action without damaging the surfaces of the electrode is gained when the size of the projection is so limited to approximately the thickness of the mounting member 11. Additionally, it is clear from the drawings that the embossed projections 20 are located well within the limits of the contoured intermediate portion 16 of the mounting member 11 so that the welds to be formed thereby are isolated from the exposed surfaces by the face-to-face contact of the outer limits of said intermediate portion 16.

During the welding operation, as the projection 20 is pressed inwardly and heated, there is formed a peripheral pool of molten metal that is moved outwardly around the convex projection 20. Since the electrode portions 13 are positioned so as to slightly overlap the recessed surface portion (as shown in FIG. 5 by the dotted-line outline of one of the electrode portions 13), the metal in the peripheral area around the raised surface portion of the projection 20 is heated and softened to a limited extent. As face-to-face contact is reached, this displaced pool of metal is trapped by the unheated interface between the parts outside the region of engagement by the electrode portions 13 so as to form a reversely directed projection weld around the periphery of said raised surface, as indicated by the reference numeral 40 in FIG. 5. It will be realized that the welded interface is thus isolated from the exposed surfaces of the finished component which means any weld splash or other irregularity that might occur in this area is isolated and incapable of causing any difficulty, such as corona discharge between electrodes in a finished gun assembly, as mentioned above.

In addition, this indirect application of the electrical current around the larger peripheral area surrounding the recessed portion is effective to prevent too rapid a buildup of heat in the embossed projection 20 which in prior art techniques sometimes cause an undesirable sudden collapse of the embossed projection 20 that destroys the penetrating power that is necessary for forming a strong weld.

In this disclosure, there is shown and described only the preferred embodiment of the invention, but, as aforementioned, it is to be understood that the invention is capable of various changes or modifications within the scope of the inventive concept as expressed by the accompanying claims.

What is claimed is:

1. In an electrode component for use in a cathode ray tube, said electrode component including an electrode body comprising a cylinder for processing the cathode ray beam and a mounting member having a thin-walled contoured face of constant thickness formed to fit the cylindrical configuration of said body for mounting thereon to serve as a strap for holding the body in place in said cathode ray tube, the improvement comprising a plurality of embossed projections formed in said mounting member, said projections including raised surface portions of substantially equal height extending from the contoured face of said mounting member to contact the outer cylindrical surface of said body, said thin-walled face having corresponding recessed surface portions on the opposite face from the embossed projections and welds formed between said cylinder and the mounting member with both members having a heated interface only in the regions of each of said embossed projections which extend only into the outer surface of the electrode body leaving the inner surface of said cylinder undeformed, with said contoured face of said mounting member being positioned in substantially face-to-face contact with the outer cylindrical surface of said body over a substantial portion of the mounting member outside the region of said welds comprising unheated interfaces surrounding each weld.

2. The combination of claim 1 wherein each weld includes a main projection weld with said raised surface portion extending into said body and a peripheral reversely directed projection weld extending into the mounting member at a ring around each of said main welds near the periphery of the projections.

References Cited by the Examiner
UNITED STATES PATENTS

| | | | |
|---|---|---|---|
| 945,554 | 1/1910 | Lachman | 219—93 X |
| 1,872,394 | 8/1932 | Bleicher | 219—93 |
| 2,909,689 | 10/1959 | Case | 313—82 |
| 3,114,030 | 12/1963 | Ruskin | 219—93 |
| 3,233,073 | 2/1966 | Ruetsch | 219—93 |
| 3,254,251 | 5/1966 | Hughes | 313—270 |

OTHER REFERENCES

Robert Aireich, Morden Projection Welding, August 1948, pp. 610–612.

JOHN W. HUCKERT, *Primary Examiner.*

A. J. JAMES, *Assistant Examiner.*

UNITED STATES PATENT OFFICE
CERTIFICATE OF CORRECTION

Patent No. 3,317,770

May 2, 1967

Chester O. Merchant

It is hereby certified that error appears in the above numbered patent requiring correction and that the said Letters Patent should read as corrected below.

In the heading to the printed specification, lines 4 to 6, for "assignor to Kentucky Electronics Inc., Owensboro, Ky., a corporation of Kentucky" read -- assignor, by mesne assignments, to Kentucky Electronics Inc., a corporation of Delaware --.

Signed and sealed this 14th day of November 1967.

(SEAL)

Attest:

Edward M. Fletcher, Jr.

Attesting Officer

EDWARD J. BRENNER

Commissioner of Patents